United States Patent Office 3,101,864
Patented Aug. 27, 1963

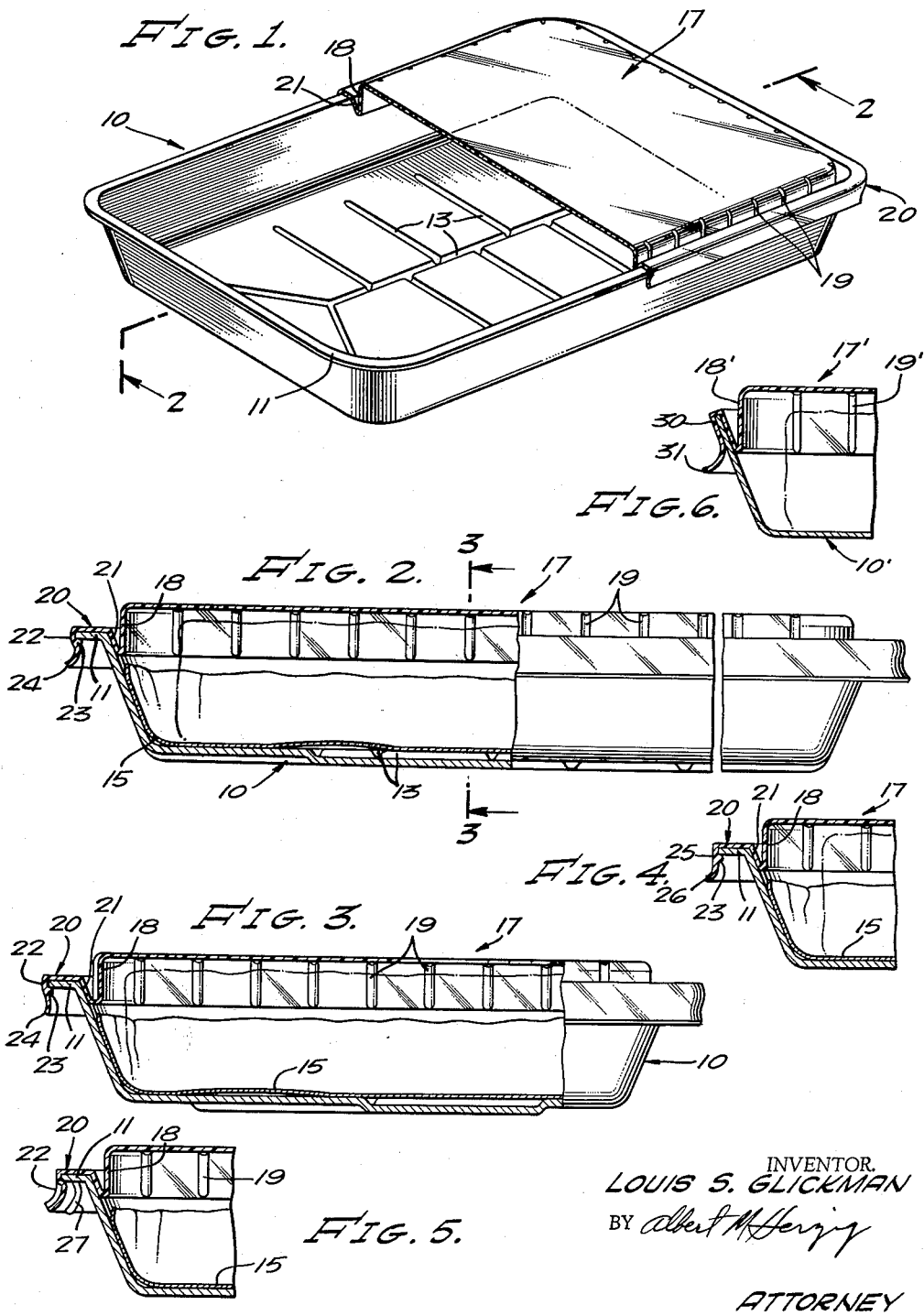

3,101,864
TRANSPARENT SNAP-ON LID FOR MEAT DISPLAY TRAY
Louis S. Glickman, 7611 Lexington Ave., Apt. 8, Los Angeles 46, Calif.
Filed Mar. 9, 1961, Ser. No. 94,479
8 Claims. (Cl. 220—60)

This invention relates to the art of display packaging of fresh meat, particularly under refrigerated conditions. The invention provides an improved, inexpensive and substantially air-tight lid for a display tray for displaying cuts of meat thereby increasing the shelf life of the meat while it is attractively displayed at the same time. The objective is to provide improved means for effectively and inexpensively displaying the meat and increasing its shelf life without discoloration or loss of the original fresh and pleasing appearance of the meat, and for reducing the tare and shrinkage as described hereinafter.

Modern marketing techniques provide for packaging and displaying individual cuts of meat. The individual cuts may be in separate packages which may be of a display type which are displayed, for example, in a refrigerated showcase so that the customer can view and inspect the various cuts and make his choice or selection therefrom. A definite problem exists in that cuts of meat so displayed and subjected to ordinary refrigeration tend to darken in color in a relatively short time which may be less than a day or even a matter of a few hours. This is a serious practical problem since when the meat darkens, it has, of course, lost its original, distinctive color and fresh appearance and no longer gives the impression, on display, of having its original quality and freshness. As is well known in the meat industry, the appearance of the product from the standpoint of quality and freshness is extremely important since the customer's impression is directly dependent thereon.

A common practice in the art has been to put the cuts of meat in trays and then to individually wrap them in transparent cellophane. The herein invention makes possible a substantial saving in time and expense which was required for wrapping while also achieving the objects stated above.

The trays used may be made of pulp, heavy paper, or paper board or other suitable materials. The trays are relatively shallow having sides which diverge outwardly slightly with an extending lip or flange. The transparent covers are made of a relatively thin, light, transparent, plastic material. The covers or lids are formed in a particular manner to have a snap-on fit with the lip on the tray and to be substantially air-tight leaving a space of approximately one-fourth inch or more between the lid or cover and the meat in the tray. The snap-on lid is preferably formed with a downwardly extending peripheral skirt which fits into the upper part of the tray. Formed integrally with the extremity of the skirt is a peripheral flange having a skirt part to fit over the lip on the tray with a snap fit. The skirt part may be provided with a bead to engage under the lip of the tray. The lid and its peripheral configuration thus can be very easily and inexpensively formed or fabricated, and yet a secure, neat, substantially air-tight transparent cover is provided over the meat. With lid having one-fourth inch space or more between upper edge of meat and lid, the space prevents the meat from excessive bleeding, shrinkage and loss of moisture in packaging which usually occurs with present types of wrapping with cellophane tightly wrapped around the contents of package. This occurs especially with packages stacked on top of each other due to the pressure of one package on another. This bleeding increases the tare, i.e. the loss of weight of the meat while packaged. This invention reduces the tare directly increasing the margin of profit on the meat. The air in the air space stays cold, acting as a refrigerant. The herein invention makes possible a reduction of substantially 50% in the tare, which amounts to 2% to 5% of the gross weight. As stated, this results from avoiding the loss of blood and moisture while the meat is packaged and on display in refrigerated self service display cases for from 12 to 24 hours. Losses using previous methods may amount to 5 to 8 cents per pound of meat. The herein invention makes possible fewer rewraps and eliminates finger nail marks and punctures attendant to known methods. The invention will further save considerable operation time, saving from 10% to 20% in labor costs.

The trays and lids are made in various sizes corresponding substantially to the various cuts of meat that are to be stored and displayed. Ordinarily, the trays are rectangular or other shapes in outline so that a cut of meat will fit into the tray with all edges of the meat spaced slightly at least from the walls of the tray to allow air circulation between those edges and the walls of the tray. Preferably, the trays are made of a material not too porous so that the meat is packaged substantially air-tight. Preferably also, the bottom of the tray is provided either with grooves or slightly raised ribs to provide space for moisture to settle and accumulate in the bottom of the tray. When placing cuts of meat in the tray, the tray may, of course, be lined with platter paper or other paper if desired to help stop bleeding of the meat and escape of moisture.

In addition to the primary objects of the invention as stated in the foregoing, it is an object of the invention to provide a tray lid of relatively thin, transparent plastic material having a peripheral edge part fitting within the top edges of the tray and having an extending flange part having a bead configurated to engage the extending lip on the tray with a snap fit.

Another object is to reduce the tare involved in the packaging and display of meat by means of the herein invention.

Another object is to provide a lid having a snap fit as in the foregoing object wherein the lid has a downwardly extending peripheral skirt with a flange having a skirt part extending from the extremity of the skirt and having resiliency to fit over the lip on the container with a snap fit, and with an outward flare at lower edge so lid will snap over edge more easily.

Another object is to provide a lid as in the foregoing objects wherein the snap-on part is provided with spaced beads or crimps.

Further objects and additional advantages of the invention will become apparent from the following detailed description and annexed drawings, wherein:

FIG. 1 is a perspective view of a preferred form of the invention with the lid shown in section;

FIG. 2 is a sectional view taken along the line 2—2 of FIG. 1;

FIG. 3 is a sectional view taken along the line 3—3 of FIG. 2;

FIG. 4 is a partial sectional view of a modified form of the invention.

FIG. 5 is a partial sectional view of another modified form of the invention.

FIG. 6 is a partial sectional view of another modified form of the invention.

In the figures, numeral 10 designates a rectangular tray which may be made of pulp, heavy paper or paper board or other suitable material more especially, a material which is fairly non-porous. By way of example, the tray has side walls diverging outwardly was shown with a peripheral extending lip 11 around the upper edge as shown. Trays such as shown at 10 may be provided in various sizes corresponding substantially to the sizes of the various cuts of meat to be packaged and/or displayed.

The bottom of the tray on the inside is provided with a pattern of grooves as shown at 13 to permit moisture to settle and accumulate in the bottom of the tray in the grooves. A cut of meat to be displayed in the tray is shown in outline. The cut of meat, if desired, may be plattered on a sheet of platter paper 15 in the tray as shown or a liner of any other suitable type of paper or the like may be used.

Each tray is provided with a transparent lid or cover 17 which is made of a relatively thin clear transparent plastic of a type providing for simple and inexpensive forming and fabricating of the lids or covers. The lid or cover has a downwardly extending peripheral skirt 18 which is normally spaced inward slightly from the upper edges of the side walls of the tray 10. Stiffening ribs are provided as shown at 19 to provide sufficient strength for stacking. Numeral 20 designates a peripheral snap-on flange, the inner part 21 of which extends integrally from the lower edge of the skirt 18 as may be seen in FIG. 2. The flange 20 is flat, its inner part 21 forming a fold with the skirt 18 which is just inside the top edges of the tray 10 and adjacent thereto. The flange 20 engages flush against the top surface of lip 11 with a substantially air-tight fit. At its outer peripheral edge flange 20 has a downwardly extending skirt part 22 curved as shown with a holding bead 23 engageable under lip 11. It has an outward flare 24 to facilitate snapping on to the tray. The flange 20 and skirt 22 have resiliency so that they can be snapped over the edge of the lip 11 on the tray into the position shown in FIGS. 2 and 3. The lip 11 is held between the flange 20 and the bead 23 on skirt 22, the fit being a snap fit. The snap fit part of the lid can be very readily snapped on or fitted over the lip 11 to provide a substantially air-tight relationship. The material of the lid 17 is thin enough so that it can be snapped on or similarly removed with ease. Thus, the meat is in a display container or package having a transparent cover without the sides or top parts of the cut of meat being in contact with any part of the container. As may be seen in FIGS. 2 and 3, spaces are provided on all sides of the cut of meat between it and the sides of the tray and the lid or cover 17.

FIG. 1 shows the appearance of the lid or cover 17 from an angle looking down on it and as may be seen, the fold or space between the part 21 of the snap-on flange appears as a continuous depression adjacent the edge of the lid. The material of the lid is quite light and the configuration shown in the figures is very easy to fabricate by well known fabrication techniques.

FIG. 4 shows a slightly modified form of the invention wherein the skirt part 25 is straight as shown with edge flare 26. The configuration of FIG. 1 is particularly adapted to injection molding processes and the configuration of FIG. 3 is particularly adapted to vacuum molding processes.

FIG. 5 shows a modification like that of FIG. 1 except that skirt 22 is provided with spaced beads or crimps 27 each providing a shoulder engageable under lip 11. The lid of FIGS. 1 to 4 may be provided with similar beads or crimps.

FIG. 6 shows a modified form of the invention adapted for a tray 10 of heavier material such as stiff card board having diverging side walls but not having lip 11. Cover 17' has a skirt 18'. A snap fold 30 fits over the inner and outer surfaces of the tray side-walls at the upper edges thereof as shown. Fold 30 connects integrally with the lower edge of skirt 18' and has an outer edge flare 31 to facilitate snapping on. Fold 30 is made to engage the sidewalls of the tray with a substantially air-tight fit.

From the foregoing, those skilled in the art will observe that the invention provides a very effective, simplified and yet very inexpensive lid for a display package for cuts of meat. The invention accomplishes its objective of saving time and expense previously expended in wrapping trays with cellophane or the like. The lids can be put on with much greater speed and facility than the trays could be wrapped. It is very effective for its purpose in the manner described particularly in that the shelf life of the meat is extended by its being protected from losing its fresh looking color and appearance. The invention therefore provides protective, sanitary, transparent packaging of cuts of meat, while minimizing the time and expense of packaging. This invention is similarly applicable for use in packaging all cuts of fish and fowl, etc.

The foregoing disclosure is representative of a preferred form of the invention and is to be interpreted in an illustrative rather than a limiting sense, the invention to be accorded the full scope of the claims appended hereto.

What is claimed is:

1. A lid for a meat tray having outwardly diverging sidewalls and an outwardly extending lip at the upper edge of the sidewalls made of relatively thin, transparent material, said lid having a peripheral part conformed to have a snap fit with the tray in substantially air-tight relationship, said lid having a first downwardly skirt part normally spaced inwardly from the upper edges of the sidewalls of the tray, an integral flange having a second skirt part extending outwardly and downwardly to fit flush over the lip of the tray with a snap fit and an inner portion integrally connected to the extremity of the first skirt part and having a slant conforming to the inner walls of the tray, the said inner portion forming a trough like fold in the lid inwardly of the said lip.

2. A lid as in claim 1 wherein the second skirt part has stiffening ribs in it.

3. A lid as in claim 1 wherein the second skirt part has a deformation engageable under the lip on the tray and said second skirt part has stiffening ribs in it.

4. In combination with a relatively shallow tray having sidewalls having an extending lip at the upper edge thereof, a lid for the tray made from a relatively light, thin formable transparent material, said lid having a peripheral snap-on part adapted for attaching the lid to the upper edges of the tray with a snap fit having substantially air-tight relationship, said snap-on part including a first part contiguously engageable with the inside surfaces of the sidewalls of the tray near the upper edge thereof, an integral part deformable to fit around and contiguously engage the said lip and to be readily manually disengageable therefrom, said lid having a vertical downwardly extending peripheral skirt integrally connected to the said first part leaving a trough like space therebetween.

5. A lid as in claim 4 wherein the snap-on part has a bead engageable under the lip on the tray.

6. A lid as in claim 5 wherein the said bead has stiffening ribs in it.

7. A lid as in claim 4 wherein the snap-on part has an edge flare to facilitate snapping onto the tray.

8. A lid as in claim 4 wherein the said skirt has stiffening ribs formed in it.

References Cited in the file of this patent

UNITED STATES PATENTS

| 2,774,472 | Badalich | Dec. 18, 1956 |
| 2,814,381 | Stevick | Nov. 26, 1957 |
| 2,833,324 | Burroughs | May 6, 1958 |
| 2,922,563 | Aldington | Jan. 26, 1960 |
| 3,032,927 | Kobs | May 8, 1962 |